Jan. 31, 1956  R. R. ANDERSON ET AL  2,732,905
TRANSMISSION CONTROL INDICATOR
Filed Oct. 31, 1952

Inventors
Ralph R. Anderson &
By William T. Setbet
Willits, Helwig & Baillio
Attorneys

United States Patent Office 2,732,905
Patented Jan. 31, 1956

2,732,905

TRANSMISSION CONTROL INDICATOR

Ralph R. Anderson and William T. Gerber, Detroit, Mich., assignors to General Motors Corporation, Detroit, Mich., a corporation of Delaware Application October 31, 1952, Serial No. 318,056

6 Claims. (Cl. 180—90)

This invention relates to indicators for vehicles and more particularly to indicators associated with transmission controls adapted for mounting within the steering column of a vehicle.

In the past it has been customary to place such instruments as the gas and oil gauges, ammeters, speedometers and the like in a compact housing on the instrument panel of a vehicle in the direct line of vision of the operator in a manner permitting the operator to ascertain, at a glance, the operating condition of the vehicle and thus minimize the time interval during which attention is diverted from the road. As a result of this practice the average vehicle operator has become accustomed to focusing attention on the relatively small area comprising the instrument cluster. It is therefore desirable that the safety factor resulting from this conditioned reflex be exploited to the fullest extent in order to further improve the safety factor in vehicle operation.

An object of this invention is to provide a transmission control having a visual position indicator disposed at the visual level common to that of the other standard indicating instruments to reduce the element of confusion inherent when various indicating instruments are disposed at different levels of vision.

Another object is to provide a transmission control indicator which permits the use of a completely streamlined steering column jacket.

A further object is to provide an indicating mechanism of the type described which is easy to install and adjust or service.

A still further object is to provide a device of the type described which is simple in construction and inexpensive to manufacture.

Other objects and advantages will become more fully apparent to those skilled in the art from the following description, reference being had to the accompanying drawings wherein.

Figure 1:
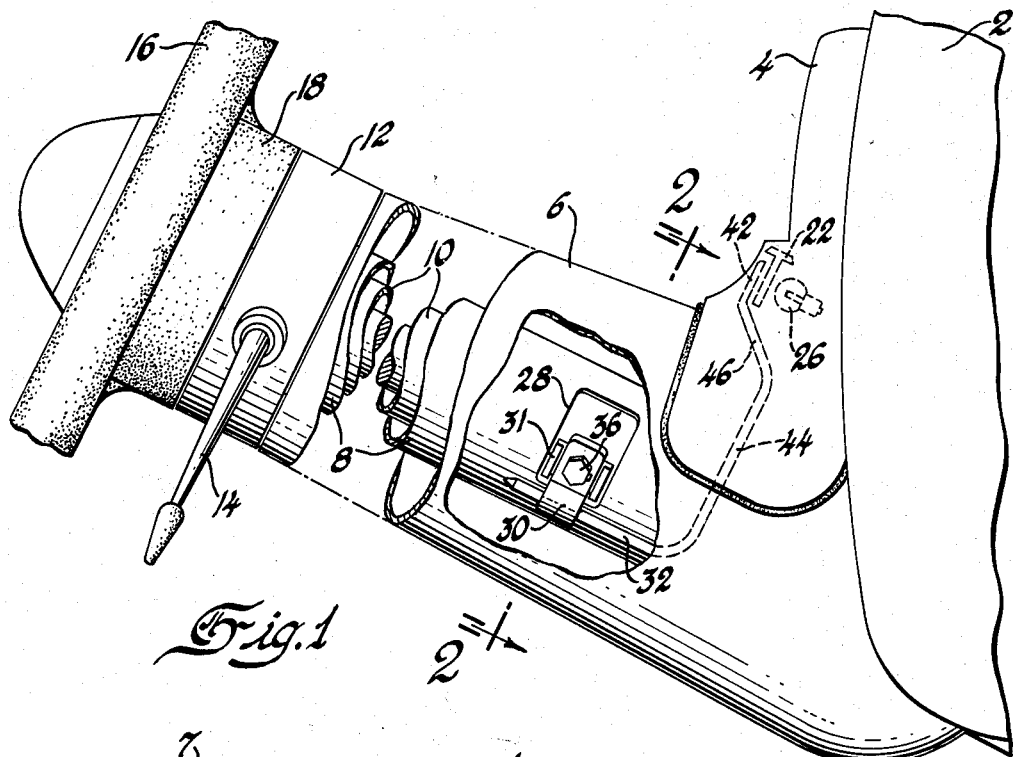
Fig. 1 is a side elevational view of an instrument panel and associated steering column assembly, certain parts being broken away to more fully illustrate the structure.

Referring now to the drawings and particularly Fig. 1, there is shown a motor vehicle instrument panel 2 having an applied shell portion 4 on the front surface thereof for housing the customary indicating instruments such as the speedometer, temperature gauge, ammeter and the like. Secured at the lower edge of the instrument panel 2 in longitudinal alignment with shell portion 4 is a steering column jacket 6 which is formed to blend into the contour of the instrument housing 4 and the instrument panel 2 and extend upwardly at a suitable angle to surround the steering column 8 and the transmission control tube 10. Adjacent the upper end of the steering column jacket 6 is a circular sleeve 12 of substantially the same diameter as the upper end of the steering column jacket 6. Sleeve 12 is adapted to receive a radially extending manually operable transmission control lever 14 for selecting the various drive positions of the transmission. Axially adjacent the circular sleeve 12 is a steering wheel 16 having a hub portion 18 immediately adjacent the upper end of said sleeve and of substantially the same diameter.

Instrument housing 4 is provided with a large cutout portion 5 having an inwardly extending flange around the edge thereof adapted to secure a transparent cover plate 7. Grouped in a suitable manner and recessed in the interior of shell 4 behind the cover plate 7 are the conventional indicating instruments, not shown, common to automotive vehicles. Below cutout portion 5, housing 4 is provided with an additional rectangular cutout portion 20. It will be understood that cutout portion 20 need not be rectangular but may be arcuate or any other desired shape, depending upon the instrument panel styling desired. Mounted inside the housing 4 and in alignment with the cutout aperture 20 is a transparent dial member 22 bearing engraved or applied legends corresponding to the various drive positions of the transmission. These legends may, of course, vary depending upon the particular type of transmission employed and the order in which drive positions are arranged in the transmission. To increase the visibility of the legends the engraving will ordinarily be opaque or suitably colored to provide the desired contrast. To provide suitable visibility for night driving a small electric lamp 26 is mounted in the interior of the instrument casing 4 directly behind the transparent dial 22. Lamp 26 will normally be connected to the instrument cluster light circuit and therefore provide continuous illumination of the dial 22 during night operation of the vehicle.

Figure 3:
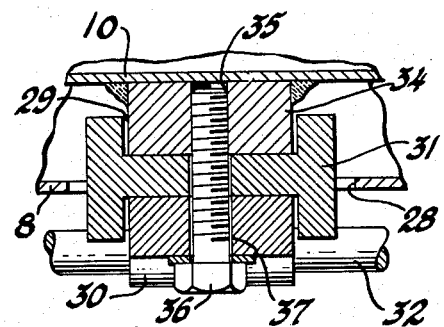
Fig. 3 is an enlarged fragmentary view in cross section showing the mode of attachment of the indicator finger to the transmission control tube.

An indicator needle 32, remotely attached on the transmission control tube 10, extends upwardly into the interior of the casing 4 between the face of the dial 22 and the cutout portion 20. Upon manual movement of selector lever 14 to each of its positions of adjustment the pointer portion 42 is moved into alignment with the corresponding legend on dial 22. Since the transmission control tube 10 is surrounded by the steering column 8, a rectangular cutout portion 28 is formed in the said steering column to provide clearance for and to permit limited rotary movement of a carrier member 30 which supports the indicator member 32. A boss 34, welded to the transmission control tube 10 in alignment with cutout 28, is provided with a threaded aperture 35. A machine screw or bolt 36 extending through a central elongated aperture 37 in the carrier member 30 and threadably engaging the threaded aperture in the boss 34 secures the said carrier in operative position. Aperture 37 provides for circumferential adjustment of carrier 30 on tube 10. As shown particularly in Fig. 3, precise alignment of carrier 30 on boss 34 is assured by a spacer 31 of substantially H-shaped cross section which is interposed therebetween. It will be apparent that carrier 30 will be automatically aligned within close limits upon tightening threaded member 36 due to the parallel oppositely facing grooves 29 milled in the spacer 31. Indicator needle 32 is secured in a longitudinally extending aperture 38 formed in the enlarged lower portion of carrier member 30 and may be adjusted longitudinally and swingably therein by loosening a set screw 40. In order to provide a clear path for the movement of indicator needle 32 within the casing 6 and housing 4 and to align the finger portion 42 in a plane immediately adjacent the transparent dial 22, said indicator needle is bent upwardly at right angles a short distance beyond the point of emergence thereof from the carrier 30 and is provided with a curved midportion 44 which extends arcuately around a portion of the steering column 8.

Near its free end, needle 32 is provided with a forwardly angled portion 46 terminating in a short backwardly tip portion forming the pointer 42.

Figure 2:
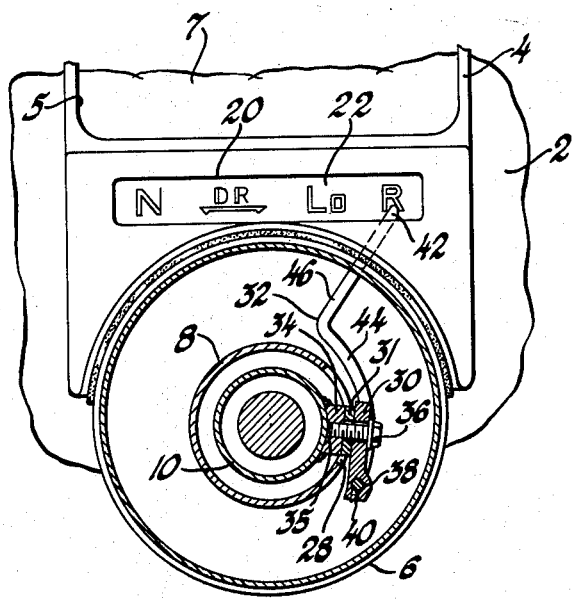
Fig. 2 is a cross-sectional view taken substantially along the line 2—2 of Fig. 1.

As seen particularly in Figure 2, rotation of the transmission control tube 10 by the selector lever 14 causes the needle 32 to describe an arc whereby the indicator point 42 transverses the aperture 20 formed in the instrument housing 4. Since the transmission control member 14 is yieldingly restrained in each of the indicated positions of adjustment by the provision of detent means, not shown, it will be apparent that the needle point 42 may be quickly and easily adjusted to a correctly correlated position with reference to the proper legend on the transparent indicator dial by loosening set screw 40 and swinging the needle 32 a few degrees in either direction, as the case may be.

From the foregoing it will be seen that the present invention provides a highly simplified indicating mechanism which permits the use of an unbroken steering column casing member, thereby contributing to the overall streamlined appearance of the vehicle control group. In addition to economic and esthetic advantages of the present device, the position occupied by the indicator contributes substantially to safety and greater ease of operation of the vehicle by placing the transmission control indicator in the visual plane normally covered by the operator when reference is had to the other conventional instruments.

It will be apparent to those skilled in the art that the present invention may be adapted for use on a variety of instrument panel designs and it is therefore not intended to limit the invention to the single embodiment shown but only by the scope of the claims which follow.

We claim:

1. In a motor vehicle, an instrument panel, a steering column for said vehicle, transmission control means mounted in said steering column, an instrument housing formed on said instrument panel, a dial formed in said housing for visually indicating the drive positions of said transmission control, an indicator member adapted for movement across the face of said indicating means, a boss formed on said transmission control means, a clamp member for said indicator member threadably secured to said boss, and a spacer of H-shaped cross section disposed between said clamp member and said boss to enable longitudinal spacing of said indicator member relative to said dial upon securing said clamp to said boss.

2. In a motor vehicle, an instrument panel, a steering column extending diagonally upwardly through a portion of said panel, a steering wheel disposed at the upper end of said column, said column having a rotatable transmission control tube concentrically disposed therein, a jacket surrounding said column and extending between said panel and said wheel, an instrument housing secured on said instrument panel above said jacket, means forming an opening in said housing, said housing overlapping a portion of said jacket to form a chamber communicating therewith, a transmission control indicator dial disposed interiorly of said housing opposite said opening, and indicator means mounted for movement with said transmission control, said means having a wire portion bent to extend into said housing and terminating in a pointer portion movable across said dial in response to movement of said transmission control.

3. In a motor vehicle, an instrument panel, a steering column connected to said panel and extending diagonally upward therefrom, a steering wheel disposed at the upper end of said column, a transmission control tube disposed within said column, a jacket secured on said panel and surrounding said steering column to provide a chamber communicating with the interior of said panel, said panel having a plurality of apertures formed therein to permit visual inspection of indicating means, including a transmission control indicator dial, an indicator needle operatively connected to said transmission control tube, and means permitting longitudinal and transverse adjustment of said needle.

4. In a motor vehicle, an instrument panel, an upwardly angled steering column connected to said panel, a steering wheel disposed at the upper end of said column, a transmission control tube disposed within said column, a jacket secured on said panel and surrounding said steering column to provide a closed annular chamber communicating with the interior of said panel, said panel having a plurality of apertures formed therein adjacent said jacket to permit visual inspection of indicating means secured in said panel, said indicating means including a transmission control indicator dial, means bent to form an indicator needle for said dial, a carrier for said indicator needle, and spacer means interposed between said carrier and said tube to align said needle upon threadable engagement of said carrier with said transmission control tube.

5. In combination, an instrument panel for a vehicle, a steering column, a rotatable transmission control mounted in said steering column, an instrument housing formed on said instrument panel, means formed in said housing for visually indicating the drive positions of said transmission control, said means including a dial having legends thereon corresponding to the shift positions of said transmission control, wire means bent to form an indicator needle, a carrier member for said indicator needle, a boss formed on said transmission control, said carrier and said boss being of substantially the same width, a spacer interposed between said boss and said carrier, said spacer having oppositely facing aligned slots disposed in straddling relation with said carrier and said boss, and means for securing said carrier, spacer, and boss in clamping engagement with each other.

6. In a motor vehicle, a steering column, transmission control means disposed within said column, an instrument panel, said instrument panel having a housing attached thereto and partially surrounding said column, vehicle indicator means in said housing including a transmission control indicator dial, an indicator needle for said dial, a carrier movable with said control, means formed in said carrier for receiving one end of said needle, and adjusting means on said carrier permitting simultaneous longitudinal and transverse adjustment of said needle relative to said control.

References Cited in the file of this patent

UNITED STATES PATENTS

| 1,213,794 | Chenoweth | Jan. 23, 1917 |
| 1,782,405 | Boyce | Nov. 25, 1930 |
| 1,999,429 | Tibbetts | Apr. 30, 1935 |
| 2,085,665 | Lackinger | June 29, 1937 |
| 2,179,368 | Baade | Nov. 7, 1939 |
| 2,222,766 | Giesen | Nov. 26, 1940 |
| 2,292,538 | Mossinghoff | Aug. 11, 1942 |
| 2,292,633 | Griswold | Aug. 11, 1942 |
| 2,535,744 | Lyman | Dec. 26, 1950 |
| 2,593,810 | Sullivan | Apr. 22, 1952 |

FOREIGN PATENTS

| 372,751 | Germany | Apr. 3, 1923 |
| 419,305 | Great Britain | Nov. 9, 1934 |
| 561,462 | Great Britain | May 22, 1944 |
| 602,971 | Great Britain | June 7, 1948 |